United States Patent
Cooper

[15] 3,663,199

[45] May 16, 1972

[54] METHOD EMPLOYING A CHEMICAL AID TO IMPROVE THE HARVESTING OF CITRUS

[72] Inventor: William C. Cooper, Winter Park, Fla.

[73] Assignee: The United States of America as represented by the Secretary of Agriculture

[22] Filed: Oct. 9, 1969

[21] Appl. No.: 865,199

[52] U.S. Cl. .................................................71/94, 71/74
[51] Int. Cl. ..........................................................A01n 9/22
[58] Field of Search ...............................71/74, 94; 424/268

[56] References Cited

UNITED STATES PATENTS 2,871,155  1/1959  Klomparens et al. ...................424/268
2,885,320  5/1959  Murray ....................................71/94 X

OTHER PUBLICATIONS

Cooper et al., Plant Physiology, Vol. 43 (Part B), pp. 1,560–1,076 (1968)

Primary Examiner—James O. Thomas, Jr.
Attorney—R. Hoffman and W. Bier

[57] ABSTRACT

An improved method for harvesting citrus which improved method involves the use of a water-based chemical spray. The improved method is based on the ability of certain chemicals in "plant hormone" quantities (i.e., about from 25 to 100 ppm) to accelerate development of an abscission layer so that the fruit ultimately to be harvested separates cleanly from the tree. Chemical control of the abscission layer development greatly facilitates mechanical harvesting operations.

1 Claims, No Drawings

METHOD EMPLOYING A CHEMICAL AID TO IMPROVE THE HARVESTING OF CITRUS

A non-exclusive, irrevocable, royalty-free license in the invention herein described, throughout the world for all purposes of the United States Government, with the power to grant sublicenses for such purposes, is hereby granted to the Government of the United States of America.

The use of modern mechanical harvesting techniques (tree shakers, air blast harvesters, and the like) for citrus at once demands that all the fruit on a particular tree or more broadly all the fruit in a particular harvest area be brought to approximately the same stage of development at a specific time. The effect of certain chemicals on the development of the abscission layer in various fruits is a recognized phenomenon and treatments are known which will hasten or delay the development of the abscission layer. Elucidation of the chemistry involved is complex and various mechanisms have been proposed.

In the particular case of cycloheximide (3[2-(3,5-Dimethyl-2-oxocyclohexyl)-2-hydroxyethyl]-glutarimide), which material is the specific chemical agent employed in the instant method, the probable mechanism involves inhibition of protein systhesis.

Cycloheximide, when applied close to the abscission zone prevents the production of the hydrolytic enzyme involved in abscission and accordingly inhibits abscission. In contrary fashion, cycloheximide, when applied at the cut end of a petiole, some distance from the abscission zone, promotes abscission. Regardless of the site of treatment, cycloheximide treated plants evolve ethylene faster than untreated plants. It has been speculated that ethylene produced in plant tissue by the influence of chemical treatment moves more rapidly to the abscission layer than does chemical agent of the treatment and in the absence of the chemical agent promotes production of the hydrolytic enzyme involved in abscission.

Such dual action is observed in the case of cycloheximide when it is applied to citrus fruit. The chemical will function both as an inhibitor and a promoter of abscission. Solutions of cycloheximide, when applied on the fruit of orange trees, promote abscission of the fruit, coincident with an increase in ethylene within the fruit. In contrast, when cycloheximide is injected into the fruit with a hypodermic syringe at a point two to three millimeters from the abscission zone, abscission is inhibited even though substantial quantities of ethylene are produced inside the fruit. When cycloheximide is applied to the fruit only or to the leaves only, the pull force required to separate the fruit or leaves from the tree is substantially less than is the case with controls. When the entire leafy portions of citrus trees are treated with aqueous based sprays that contain cycloheximide, the pull force required to separate fruit from the tree decreases markedly about 4 days after treatment. Pull force has been found to be inversely related to the amount of cycloheximide in the aqueous spray. Whatever the actual physiology involved, we have, as a result of our discoveries, devised a preharvest, water-based spray application that is effective and is economic.

As an orange fruit matures, a starch-filled layer of cells called the abscission layer develops in the rind across the veins around the button separating it from the fruit. When the fruit of some varieties are fully colored and remain attached to the tree for an additional 6 to 8 weeks, they usually abscise cleanly from the button at the abscission layer. This, however, does not occur readily in fruit with green rind adjacent to the button, even though the flesh of the fruit may have attained acceptable maturity standards for eating quality. Degreening of the rind of oranges usually occurs at the onset of cool weather in the winter, beginning at the stylar end and progressing gradually to the stem end. The rind adjacent to the button is the last portion to degreen. Different varieties of oranges vary in the degreening pattern. "Pineapple" (Citrus sinensis [L.] Osb.) oranges are usually completely degreened when mature in January and February, and usually at this time separate readily at the button. If Pineapple fruit are not harvested at this time, preharvest fruit drop may occur. The rind of "Valencia" (Citrus sinensis [L.] Osb.) oranges, on the other hand, may be degreened in March and later on in April and May will regreen at the stem end adjacent to the button. Such fruit may actually become more tightly attached to the fruit stem in May than they were in March.

When fruit is mechanically harvested and the cells of abscission layer have not begun to separate, a break or tear may take place through the parenchymatous tissue of the rind and a plug of tissue, including the button, is removed from the rind. Sometimes the fruit stem is broken, leaving a jagged woody stem attached to the fruit.

Accelerated development of an abscission layer, so that the fruit separates cleanly at the button, should greatly facilitate mechanical harvesting.

In general, the method of this invention comprises treating the citrus tree with an aqueous based spray mist containing from 25 to 100 parts per million of cycloheximide. The spray is preferably applied several (3 to 9) days prior to the intended time of harvest and sufficient spray is applied to each tree so that complete coverage of the fruit and leaves is achieved (typically about 15 gallons per tree).

It will be anticipated by those skilled in the science of biochemistry and plant physiology that more or less concentrated spray treatments applied once or alternatively applied according to a program of multiple applications will permit a degree of control of the method. Reliable control allows an orderly harvest schedule with crop maturity and mechanical harvest capability balanced.

The following example will demonstrate the method of our invention with more specificity:

Experiments were conducted with mature trees of "Hamlin" [citrus sinensis (L.) Obs.], Pineapple, "Jaffa" [Citrus sinensis (L.) Osb.], and Valencia oranges. An airblast machine was used in some tests and a tree shaker was used in others. In the airblast machine harvest tests on Pineapple and Jaffa oranges, trees were harvested after being subjected to the chemical spray treatments shown in the tables. Similar tests were carried out with Valencia oranges. Tree-shaker machine harvest tests were conducted on orange trees of the Hamlin variety.

The foregoing material, together with data on other experimental substances, can be found in a comprehensive article by W. C. Cooper, et al., "Control of Abscission in Agricultural Crops and Its Physiological Basis," in the special issue of Plant Physiology, Vol. 43 (Part B), pages 1,560–1,076 (1968).

TABLE I

| Treatment number, chemicals and concentration | Pull force[1] (lb.) | Airblast harvest (1968 crop) | | | Fruit set count on 1969 crop | | Green fruit chemical injury (percent) | Green fruit wind injury | |
|---|---|---|---|---|---|---|---|---|---|
| | | Crop harvested (percent) | Chemical injury (percent) | Physical injury[2] (percent) | Airblast | Hand picked | | Airblast (percent) | Hand picked (percent) |
| 1. Water (control) | 17 | 53 | 0 | 53 | 29 | 29 | 0 | 19 | 29 |
| 2. 2 p.p.m. CYH | 13 | 92 | 17 | 20 | 22 | | 0 | 22 | |
| 3. 5 p.p.m. CYH | 13 | 80 | 13 | 14 | 31 | | 0 | 12 | |
| 4. 10 p.p.m. CYH | 12 | 84 | 6 | 22 | 25 | | 0 | 30 | |
| 5. 2% EA plus 0.2% FeAC | 11 | 95 | 30 | 21 | 21 | | 0 | 29 | |

[1] Average 25 measurements on each of the 4 trees just prior to harvest.
[2] Includes fruit plugging, splitting, and stems attached.

NOTE.—Treatments 1–4 sprayed 6/1/68, 2.11" rain 6/2–5/68; treatments 2, 3, and 5 sprayed 6/7/68. All treatments harvested 6/10/68.

TABLE II

Effect of CYH on abscission of Valencia oranges[1]

| Treatment No. | Conc of CYH | Pull force[2] | Mature fruit drop | Green fruit drop count |
|---|---|---|---|---|
| | (ppm) | (lb) | (%) | (%) |
| 1. | Water (control) | 18 | 2 | 5 |
| 2. | 10 | 10 | 12 | 5 |
| 3. | 25 | 6 | 32 | 5 |
| 4. | 50 | 4 | 56 | 5 |
| 5. | 100 | 3 | 70 | 5 |
| 6. | 500 | 0 | 100 | 5 |

1. Limb units containing 45 fruits each were sprayed with each treatment; sprayed 5/3/68 and fruit harvested 1 week later.
2. Average of 25 fruits remaining on the limb after shaking it by hand. In Treatment 6, all fruit dropped to the ground.

TABLE III

Rate of fruit and leaf abscission of Valencia oranges at various intervals during the first week after spraying with dilute solutions of CYH

| Treatment No.[1] | Conc CYH | Pull force after | | | Cumulative fruit drop after | | |
|---|---|---|---|---|---|---|---|
| | | 2 days | 4 days | 7 days | 2 days | 4 days | 7 days |
| | (ppm) | (lb) | | | (%) | | |
| 1. | Water | 16 | 18 | 18 | 0 | 0 | 4 |
| 2. | 1 | 15 | 15 | 15 | 0 | 0 | 4 |
| 3. | 5 | 12 | 13 | 12 | 0 | 4 | 12 |
| 4. | 10 | 11 | 12 | 9 | 0 | 8 | 12 |
| 5. | 25 | 11 | 8 | 5 | 0 | 12 | 60 |

1. Treatments applied to limb units that contained 100 fruit each on 5/17/68.

Having described and demonstrated the method of our invention, we claim:

1. In the mechanical harvesting of citrus fruit, the improvement that consists of the following sequential operations:
   a. applying to the entire leafy portion of the citrus tree at a predetermined period prior to the intended time of harvest, an aqueous based spray which spray contains from 25 to 100 parts per million of cycloheximide to accelerate the formation of an abscission layer between the fruit of the citrus tree and the fruit supporting stem; and
   b. harvesting the citrus fruit at the time formation of the abscission layer is completed.

* * * * *